United States Patent [19]

Wong

[11] Patent Number: 4,821,317

[45] Date of Patent: Apr. 11, 1989

[54] ELASTIC TELEPHONE HANDSET SUPPORT

[76] Inventor: Poon Wong, 43 Essex St., Apt. #2, New York, N.Y. 10002

[21] Appl. No.: 96,139

[22] Filed: Sep. 11, 1987

[51] Int. Cl.⁴ ............................................. H04M 1/05
[52] U.S. Cl. .................................. 379/430; 379/433; 379/449
[58] Field of Search ............... 379/430, 449, 447, 433, 379/455, 446, 441, 428, 419

[56] References Cited

U.S. PATENT DOCUMENTS

| | | | |
|---|---|---|---|
| 2,360,027 | 10/1940 | Werner | 379/430 |
| 2,503,846 | 12/1946 | Shann | 379/430 |
| 2,653,193 | 5/1949 | Anderson | 379/430 |
| 2,676,213 | 8/1951 | Anderson | 379/430 |
| 2,802,062 | 8/1955 | Dalton | 379/449 |
| 2,998,497 | 4/1960 | May | 379/449 |
| 4,241,242 | 12/1980 | Yeh et al. | 379/449 |
| 4,367,378 | 1/1983 | Jordan | 379/430 |

FOREIGN PATENT DOCUMENTS 0071544 1/1953 Netherlands ......................... 379/430

*Primary Examiner*—Jin F. Ng
*Assistant Examiner*—Randall S. Vaas
*Attorney, Agent, or Firm*—Adrian Calderone

[57] ABSTRACT

An elastic telephone handset support for supporting a telephone handset to the head of a person, thereby enabling him or her to carry on a telephone conversation while having both hands free. The elastic telephone handset support comprises an extendable elastic loop which may be placed around the head of the person to support the upper end of the telephone headset, and an extendable support rod which contacts the shoulder of the person to support the lower end of the handset. Both the elastic loop and the support rod are retractable into the interior of the handset.

7 Claims, 2 Drawing Sheets

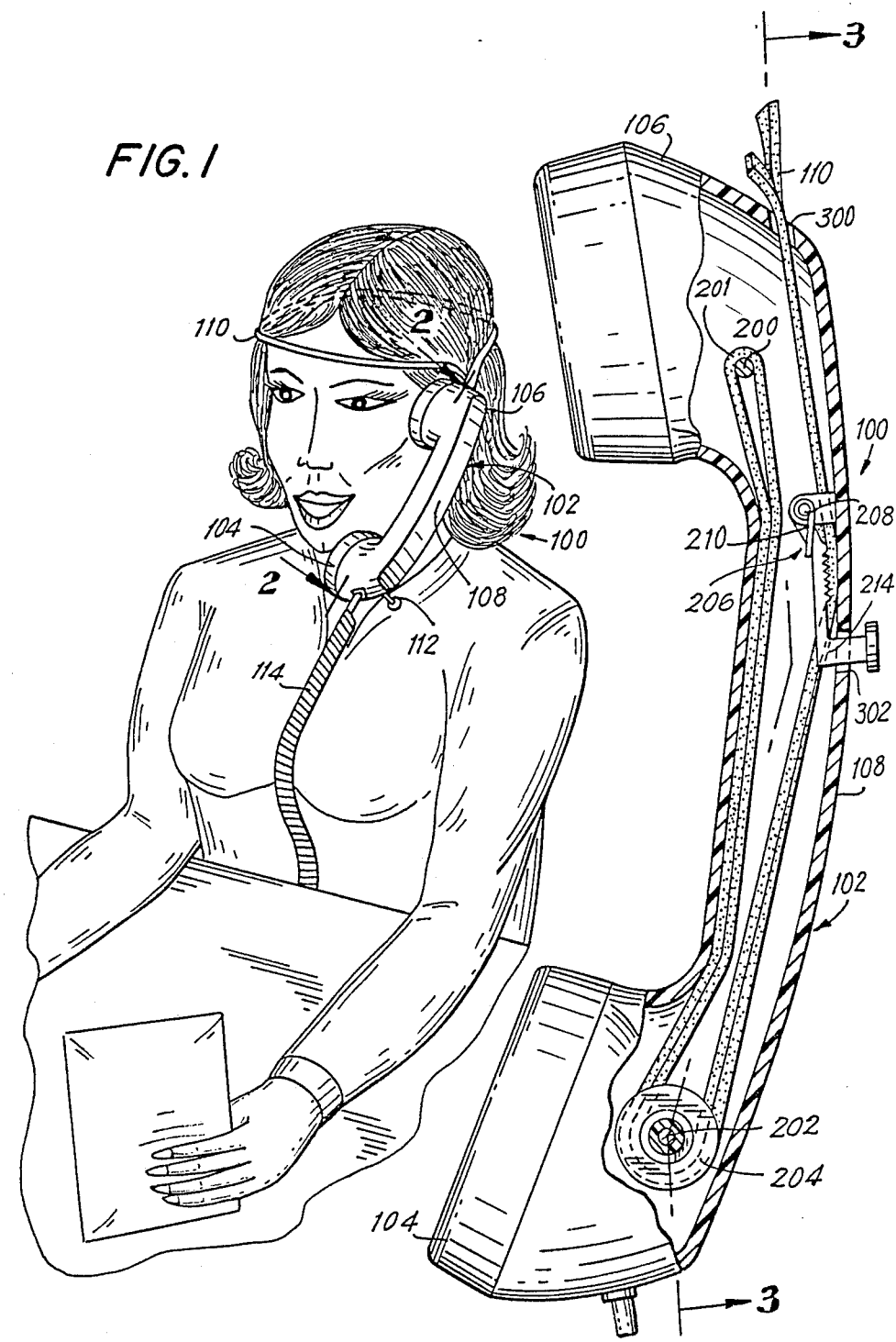

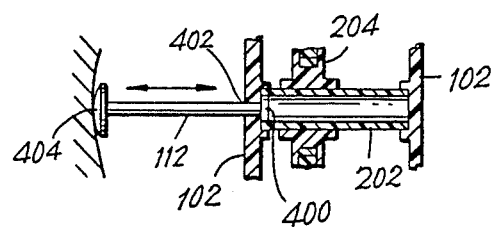
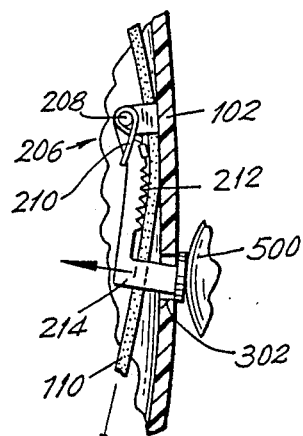
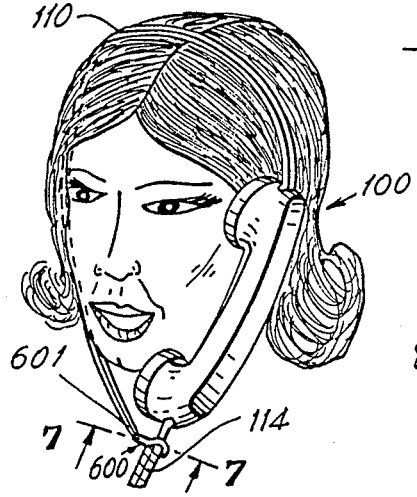
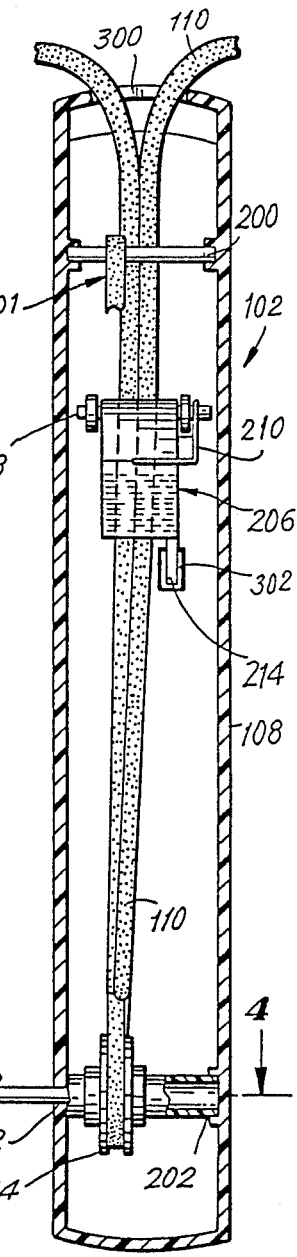

ELASTIC TELEPHONE HANDSET SUPPORT

BACKGROUND OF THE INVENTION

1. Field of the Invention

This invention relates to an improved system for securely supporting a telephone handset, allowing the user to carry on a conversation while having his or her hands free for domestic or office chores.

2. Description of the Prior Art

There have been a number of patents granted to inventions which relate to the support of telecommunications headsets. Some inventions relate more specifically to the support of a conventional telephone handset which allows the user to have both hands free. Of the prior art known to applicant, U.S. Pat. No. 4,367,378 of Jordan, and U.S. Pat. No. 2,998,497 of May are believed to constitute the most pertinent art. Jordan's invention is an elastic band which wraps around the user's head and which uses hook and eye fastening members to secure the elastic band to the telephone handset. May's invention employs a resilient head engaging member and flexible strap.

In both inventions the supporting means is exterior to the handset when not in use. This creates the possibility that the support will be misplaced or not conveniently handy when it is needed, and it necessitates the taking up of extra space for storage when it is not needed. The present invention is designed to be retractable into the handset when not in use so that it is always at hand when needed.

It is fully adjustable to fit any user and it may be used in more than one way to support the telephone handset.

OBJECTS AND ADVANTAGES

Accordingly, one object of this invention is to provide an adjustable support for a telephone handset so that the user may carry on a conversation while having both hands free to perform other tasks.

It is a further object of this invention to provide a flexible support for a telephone handset.

Another object of this invention is to provide a support for a telephone handset which is retractable into the handset.

Yet another object of this invention is to provide an elastic support for a telephone handset which may be used in several directions around the user's head.

BRIEF DESCRIPTION OF THE DRAWINGS

FIG. 1 illustrates a perspective view of the invention in use.

FIG. 2 illustrates a side view of the interior of the telephone handset.

FIG. 3. shows another interior view of the telephone handset support mechanism.

FIG. 4. illustrates the extended shoulder supported rod.

FIG. 5. illustrates the retaining clip.

FIG. 6. shows another mode of use of the elastic telephone handset support invention.

FIG. 7. illustrates the use of the hooking clasp.

NOMENCLATURE LIST

100—generally refers to an elastic telephone handset support
102—telephone handset housing
104—transmitter end of the telephone handset
106—receiver end of the telephone handset
108—elongated central portion of the telephone handset
110—elastic loop
112—shoulder supported rod
114—telephone wire
200—upper shaft
201—fixed end of the elastic loop
202—lower shaft
204—pulley wheel
206—retaining clip
208—hinge
210—spring
212—frictional surface
214—lever
300—exit opening for elastic loop
302—lever exit opening
400—outward crimp
402—exit opening for shoulder support rod
404—foot pad
500—finger of user
600—hooking clasp
601—movable end of the elastic loop

DESCRIPTION OF THE INVENTION

Referring now in detail to the drawings, which illustrate the preferred embodiment of this invention, FIG. 1 illustrates the use of an elastic telephone handset support 100 in which a conventional one-piece rigid telephone handset 102 may be supported by means of an elastic loop 110 extending horizontally around a user's head and a shoulder supported rod 112. The telephone handset is of conventional shape having a transmitter end 104, a receiver end 106, and an elongated central portion 108. A coiled telephone wire 114 connects the telephone handset with the main body of the telephone.

FIG. 2 illustrates the interior of the handset 102 showing the details of the invention. An elastic loop 110 is retained at fixed end 201 by an upper shaft 200 located in the receiver portion of the handset 106. The elastic loop 110 extends downward through the elongated central portion of the handset 108, around pulley wheel 204 located on lower shaft 202 in the transmitter portion of the handset 104, and up again through the central portion of the handset 108, through the retaining clip 206 and out through exit opening 300. The retaining clip 206 is mounted on hinge 208 and is held pressed against the elastic loop 110 by a spring 210. Hinge 208 is permanently mounted on the interior wall of the telephone handset 102. Lever 214 extends out of the handset 102 through lever exit opening 302. When lever 214 is pressed the retaining clip 206 releases the elastic loop 110. The elastic loop 110 must be of such length and resiliency that in a fully relaxed, contracted state it would not extend beyond the exit opening 300, and in its expanded state it will extend snugly and comfortably around a user's head. It can be made or rubber or rubber like material.

FIG. 3 illustrates an additional interior view of the handset 102 from another perspective. Upper shaft 200 is preferably a solid metal rod extending horizontally across the interior of the handset 102 and fixed at both ends to the interior walls thereof. Pulley wheel 204 is rotatably mounted on lower shaft 202. The surface of the pulley wheel 204 in contact with the elastic loop 110 may be concave so as to keep the elastic loop 110 aligned on the pulley. Lower shaft 202 is hollow. Shoulder supported rod 112 is slidably mounted within the interior of lower shaft 202. When in use the shoulder support rod 112 may be telescopically extended out through exit opening 402. The elastic loop exit opening 300 is slot shaped to facilitate positioning of the elastic loop 110 around the user's head.

The shoulder supported rod 112 is shown in greater detail in FIG. 4. Lower shaft 202 extends horizontally across the interior of the handset 102 and is permanently fixed at both ends thereto. Lower shaft 202 is hollow. One end is closed off by the wall of the handset 102. The other end is mounted at exit opening 402. The diameter of the exit opening 402 is slightly less than the diameter of the interior of the lower shaft 202. The shoulder supported rod 112 is slidably mounted in the interior of the lower shaft 202. The outer diameter of the shoulder supported rod 112 is slightly smaller than the diameter of the exit opening 402, thereby allowing the shoulder supported rod 112 to be telescopically extended out of the handset 102. The interior end of supported rod 112 has an outward crimp 400 which presents a diameter larger than that of exit opening 402, thereby preventing the shoulder supported rod 112 from being completely pulled out of the handset 102, or from accidentally falling out. A button shaped foot pad 404 is attached to the exterior end of shoulder supported rod 112. Foot pad 404 comes in contact with the user's shoulder and provides greater surface area of contact than the shoulder supported rod 112 alone. It also provides the user with a means for grasping the shoulder supported rod 112 when it is retracted into the interior of the lower shaft 202.

FIG. 5 illustrates the operation of the retaining clip 206 which is mounted on hinge 208. Hinge 208 is permanently mounted to the interior wall of the handset 102. A resilient spring 208 applies force to the retaining clip 206 thereby keeping it pressed against the elastic loop 110 which extends between the retaining clip 206 and the interior wall of the handset 102. The surface of the retaining clip 206 which comes in contact with the elastic loop 110 has a serrated frictional surface 212 to increase the grip of the retaining clip 206 on the elastic loop 110. The lever arm of the retaining clip 214 extends out of the handset 102 through lever exit opening 302. When the user presses the lever 214 with his or her finger 500, the retaining clip 206 is pushed back and the elastic loop 110 is allowed to retract within the interior of the handset 102.

An alternate mode of use of the elastic telephone handset support 100 may be seen in FIG. 6. A hooking clasp 600 is attached to the exterior end of the elastic loop 110. The elastic loop 110 may be extended vertically around the user's head and the end of the loop 110 may be hooked onto the telephone wire 114 by means of the hooking clasp 600. FIG. 7 shows in detail how the clasp 600 hooks onto the telephone wire 114. The clasp 600, being of larger size than the elastic loop exit opening 300, prevents the elastic loop 110 from completely retracting out of reach of the user into the interior of the handset 102. It also provides the user with a convenient means to grasp the elastic loop 110 and pull it out of the telephone handset housing 102.

The essential functioning elements of this invention include a standard one-piece telephone handset housing 102, an elastic loop 110 to secure the receiver end of the telephone handset 106 to the head of the person, a retaining clip 206 to prevent the elastic loop 110 from retracting into the handset 102 when in use, a means to open and close the retaining clip 206, a means for supporting the lower transmitter end of the telephone handset 104 and a catch means whereby the person may grasp the elastic loop 110 in order to pull it out.

The elastic loop 110 has an interior end 201 attached in the interior of the telephone handset housing 102 (preferably to an upper shaft 200), and an exterior end 601 portion which is elastically extendable to a position predominantly exterior to the handset 102. This exterior end 601 portion is elastically retractable to a relaxed state in which it would be located predominantly inside the telephone handset housing 102.

The retaining clip 206 utilizes a resilient spring 210 to keep the clip's serrated frictional surface 212 in contact with the elastic loop 110. When the loop is thus engaged it cannot retract into the handset. This retaining clip 206 divides the tension along the elastic loop 110 such that the portion of the loop 110 between the retaining clip 206 and the fixed end 201 is under higher tension than the portion of the loop 110 located between the retaining clip 206 and the movable end 601. This division of tension allows the elastic loop to be greatly extendable, yet comfortable and easy to handle. Because the movable end 601 portion, which is in contact with the head of the person, is under relatively lower tension, it will not grip the person's skin too sharply, nor will it have a tendency to snap back into the handset 102.

One way to avoid exceeding the breaking strength of many of the materials from which the elastic loop 110 may be fabricated, is by distributing the high tension over a greater length of loop 110. This can be accomplished by positioning the loop 110 so that it extends down the length of the handset 102, circumferentially contacts pulley wheel 204, and then doubles back up the handset 102 through the retaining clip 206.

The retaining clip 206 must be movable to an open position to allow the elastic loop 110 to retract into the telephone handset housing 102 when not in use. A lever arm 214, rigidly attached to the clip 206 and projecting through and beyond lever exit opening 302 a sufficient distance to allow responsiveness to being pressed, accomplishes the task of moving the retaining clip 206 to an open position.

In addition to the elastic loop 110 supporting the upper receiver end of the handset 106, the telephone handset housing 102 needs another point of support at the lower transmitter end 104. This is accomplished by the extendable shoulder supported rod 112 which rests upon the shoulder of the person.

The elastic loop 110 needs some catch means to enable the person to grasp the exterior end 601 of the loop. Without such a means the loop 110 would contract out of reach into the interior of the handset housing 102. This function is accomplished by the hooking clasp 600 which also performs the function of hooking onto the telephone wire 114 as in FIG. 6.

Operation of the elastic telephone handset support 100 is very easy. The user simply grasps the hooking clasp 600 and pulls out the elastic loop 110. The user opens the loop 110 and secures it horizontally around his or her head. The user then pulls out the shoulder supported rod 112 and props up the handset on his or her shoulder. This will now allow the user to carry on a phone conversation without having to hold the phone. This invention can be manufactured in a left hand version or a right hand version depending on which side of the phone the shoulder supported rod 112 will extend from. When the user has completed the conversation, he or she can remove the elastic loop 110 from the head and press the lever 214. The elastic loop 110 will then automatically retract into the handset 102. Alternatively, the user may extend the loop 110 vertically around the head as shown in FIG. 6.

While the above description contains many specifics, the reader should not construe these as limitations on the scope of the invention, but merely as exemplifications of the preferred embodiment thereof. Those skilled in the art may envision other possible variations that are within its scope. For example, the loop exit opening 300 may be variously shaped (circular, oval, slot shaped, etc.). The elastic loop 110 may be made of any elastic material with suitable strength, resiliency, and elasticity. Various materials of construction may be used for the other mechanical components of this invention. Although an upper shaft was used to secure the end of the elastic loop in the interior of the interior of the handset, any suitable means for securing the end of the elastic loop would function satisfactorily. Accordingly, the scope of the invention should not be determined by the preferred embodiments, but by the appended claims and their legal equivalents.

I claim:

1. A telephone handset in combination with a device for supporting the handset on the head of a person, comprising:
    (a) the telephone handset enclosing an interior space and having an interior surface, an exterior surface, a transmitter end, a receiver end, and an elongated handle portion connecting both ends,
    said telephone handset further having a first opening in the receiver end, and a second opening in the transmitter end;
    (b) an elastic loop for securing the receiver end of the telephone handset to the head of the person,
    said elastic loop having a fixed end and a movable end,
    said movable end being elastically extendable through the first opening in the telephone handset to a first position wherein the elastic loop is predominantly exterior to the telephone handset, and elastically retractable to a second position wherein the elastic loop is predominantly interior to the telephone handset;
    (c) means interior to the telephone handset to secure the fixed end of the elastic loop therein;
    (d) a resilient clip fixedly attached to the interior surface of the telephone handset,
    said clip being resiliently held in a closed position frictionally engaging the elastic loop,
    said clip being movable to an open position which disengages and releases the elastic loop;
    (e) means responsive to pressure to move the resilient clip to the open position;
    (f) a rod means for supporting the transmitter end of the telephone handset on the shoulder of the person;
    (g) a catch means for grasping the movable exterior end of the elastic loop.

2. The invention of claim 1 wherein the rod means for supporting the transmitter end of the telephone handset on the shoulder of the person comprises:
    (a) a lower shaft in the transmitter end of the telephone handset,
    said lower shaft having a hollow interior and an end mounted adjacent to the second opening in the transmitter end of the telephone handset;
    (b) a shoulder supported rod slidably mounted in the hollow interior of the lower shaft and having a first end for contacting the shoulder of the person, and a second end,
    said shoulder supported rod being telescopically extendable through the second opening in the transmitter end of the handset to a first position predominantly exterior to the telephone handset and returnable to a second position predominantly inside the lower shaft,
    said second end having a diameter slightly larger than the diameter of first opening in the transmitter end of the handset, but smaller than the interior diameter of the lower shaft.

3. The invention of claim 2 wherein the means responsive to pressure to move the resilient clip into the open position comprises a movable lever arm rigidly attached to the resiliently held clip and having an end projecting through and beyond a third opening in the telephone handset housing a distance sufficient to move the resilient clip into the open position when the end of the lever arm beyond the third opening is pressed down flush with the exterior surface of the handset.

4. The invention of claim 3 wherein the means interior to the telephone handset to secure the fixed end of the elastic loop therein comprises an upper shaft located interior to the telephone handset and to which the fixed end of the elastic loop is attached,
    said upper shaft being attached to the interior surface of the telephone handset.

5. The invention of claim 4 wherein the catch means for grasping the movable end of the elastic loop comprises a hooking clasp attached to the movable end of the elastic loop and located exterior to the telephone handset,
    said hooking clasp having an effective diameter larger than the first opening in the telephone handset.

6. The invention of claim 5 additionally comprising a foot pad for contacting the shoulder of the person,
    said foot pad being attached to the first end of the shoulder supported rod and being located exterior to the telephone handset,
    and said foot pad having a diameter greater than the diameter of the second opening in the transmitter end of the housing.

7. The invention of claim 6 additionally comprising a pulley wheel rotatably mounted on the lower shaft and having a circumferential surface for contacting the elastic loop.

* * * * *